United States Patent [19]

Plapp

[11] 4,343,183
[45] Aug. 10, 1982

[54] APPARATUS FOR MEASURING AIR FLOW IN THE AIR INTAKE MANIFOLD OF AN INTERNAL COMBUSTION ENGINE

[75] Inventor: Günther Plapp, Filderstadt, Fed. Rep. of Germany

[73] Assignee: Robert Bosch GmbH, Stuttgart, Fed. Rep. of Germany

[21] Appl. No.: 118,018

[22] Filed: Feb. 4, 1980

[30] Foreign Application Priority Data

Feb. 22, 1979 [DE] Fed. Rep. of Germany ....... 2906847

[51] Int. Cl.³ .............................................. G01F 1/68
[52] U.S. Cl. ...................................................... 73/204
[58] Field of Search .................. 73/204, 362 AR, 708, 73/116, 118; 323/366

[56] References Cited

U.S. PATENT DOCUMENTS

| | | | |
|---|---|---|---|
| 2,650,496 | 9/1953 | Middleton et al. | 73/204 |
| 2,947,938 | 8/1960 | Bennett | 73/204 X |
| 3,085,431 | 4/1963 | Yerman et al. | 73/204 |
| 3,429,178 | 2/1969 | Durbin | 73/27 |
| 3,800,592 | 4/1974 | Jones, Jr. | 73/204 |
| 4,233,848 | 11/1980 | Sato | 73/708 |

*Primary Examiner*—Herbert Goldstein
*Attorney, Agent, or Firm*—Edwin E. Greigg

[57] ABSTRACT

An apparatus for measuring the flow of air through the air intake manifold of an internal combustion engine. A controller regulates current to a bridge circuit having a first temperature-dependent resistor which is disposed in the air flow within the manifold, and whose resistance is a function of the current flow therethrough and the flow rate and temperature of the air. A second fast-responding temperature-dependent resistor, which is disposed in the manifold and supplied with a very small current so that its resistance is essentially a function of the air temperature, provides an air temperature signal which is amplified and/or differentiated and supplied to the controller as a precise correction signal for the bridge diagonal voltage signal which is also an input signal to the controller, so that the current output of the controller is an accurate measure of the air flow.

17 Claims, 4 Drawing Figures

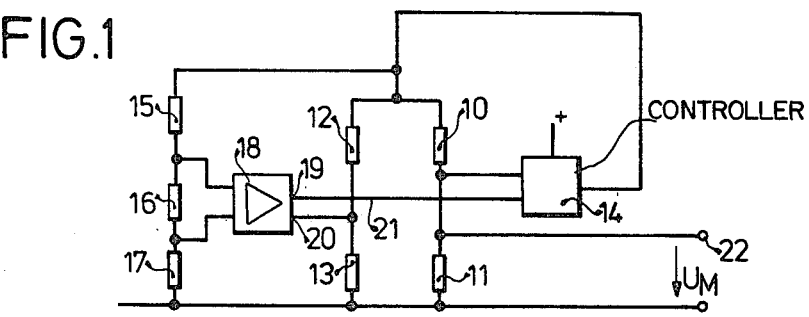
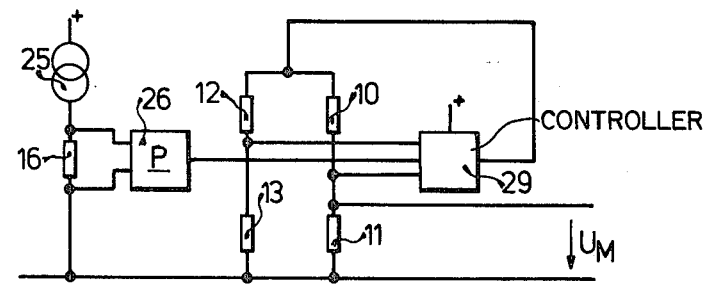
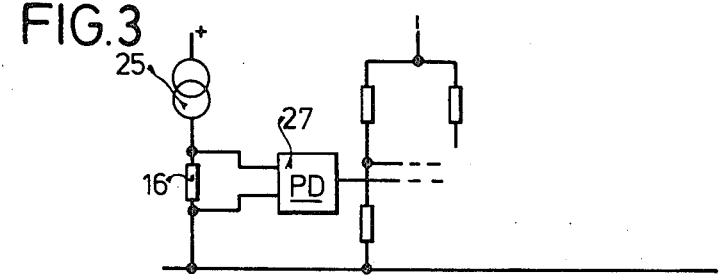
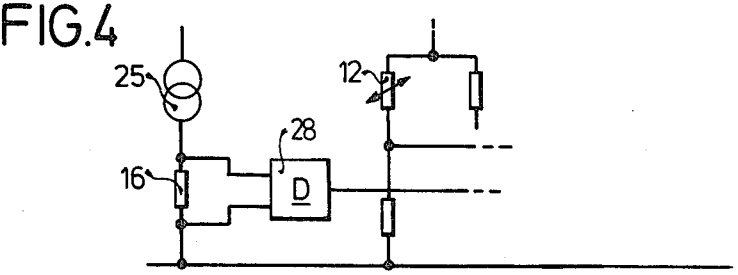

APPARATUS FOR MEASURING AIR FLOW IN THE AIR INTAKE MANIFOLD OF AN INTERNAL COMBUSTION ENGINE

BACKGROUND OF THE INVENTION

The invention relates to an apparatus for measuring the flow rate of air through the intake manifold of an internal combustion engine having a resistance bridge circuit which includes at least one resistor disposed in the air flow within the intake manifold, and a controller for the current flowing through the bridge circuit. In known apparatus of this type, for example, that disclosed in U.S. Pat. No. 3,796,199, issued Mar. 12, 1974 to Heinrich Knapp, two of the four bridge resistors are embodied as temperature-dependent resistors, one which serves to accomplish the actual air mass measurement and the other which is intended to furnish a correction signal in accordance with the induced air temperature. It has now been demonstrated that, in the case of rapid temperature fluctuations, the induced air temperature correction attainable by this known apparatus is not entirely satisfactory, because it is unable to furnish a sufficient correction signal.

OBJECT AND SUMMARY OF THE INVENTION

It is an object of the invention to provide an apparatus for measuring the air throughput in the intake manifold of an internal combustion engine in which the correction of the air mass signal relative to the air temperature is both precise and rapid.

The apparatus includes a controller which supplies a current to a bridge circuit having first a fast-responding, temperature-dependent resistor disposed in the air flowing through the air intake manifold, and embodied as a hot wire or film. The resistance value of this first resistor is a function of the flow rate and temperature of the induced air, and the current flowing through the first resistor. The diagonal voltage of the bridge circuit, which is proportional to the voltage drop across the first resistor, is used as an input signal to the controller. When the temperature of the induced air is constant, the controller regulates its output current to maintain the bridge diagonal voltage, and consequently the resistance of the first resistor, whereby the controller output current is proportional to the flow rate of the induced air.

A second fast-responding, temperature-dependent resistor, which may be of the same type as the first resistor, is also disposed in the air intake manifold. A very small current, in the order of 1 to 3 milliamperes, is supplied to the second resistor to minimize self-heating of the second resistor by current flowing therethrough, so that the resistance value of the second resistor primarily is a function of the induced air temperature. The voltage signal produced across the second resistor is amplified and/or differentiated in a signal processor and supplied to the controller as an air temperature correction signal for the air mass measurement signal supplied to the controller by the bridge circuit, so that the current output of the controller is an accurate measure of the induced air flow, even during rapid fluctuations in the induced air temperature.

Particularly in the case where a differentiation signal processing circuit is used, temperature fluctuations can be extremely precisely detected and taken into account in the measurement product.

The temperature sensor may have the same structure and be made of the same material as the temperature-dependent resistor of the bridge circuit for measuring the air mass.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 shows a first exemplary embodiment of the invention in which a resistor for detecting the induced air temperature is disposed parallel to the bridge;

FIGS. 2-4 each show further embodiments of the invention, each including a supply of constant current to the temperature-detecting resistor but each including a different type of temperature signal processor.

DESCRIPTION OF THE PREFERRED EMBODIMENTS

The four embodiments illustrated in FIGS. 1-4, relate to apparatuses for measuring the air throughput in the intake manifold of an internal combustion engine. In FIG. 1, four resistors 10-13 are connected to form a bridge circuit. The resistor 10 is a hot wire or hot film of known structure, which is connected in series with a measurement resistor 11 at an intermediate connection point to form a first resistive path 10-11. The resistor 12 is connected in series with the resistor 13, at another intermediate connection point to form a second resistive path 12-13. The two resistive paths are then connected in parallel to complete the bridge circuit. The bridge circuit is supplied with an electrical current from a controller 14, whose structure is also known. For example, the controller may be similar to that disclosed in the above-references U.S. Pat. No. 3,796,199.

The resistor 10 is embodied as a hot wire or hot film of known structure which is heated by the flow of current therethrough and which is disposed in the air flowing within the air intake manifold and cooled thereby, so that the voltage drop across the resistor 10, and the voltage across the intermediate connection points of the bridge circuit will vary as a function of the flow rate and temperature of air flowing within the air intake manifold as well as the current flowing through the resistor 10.

A series circuit of three resistors 15, 16 and 17, is connected as a voltage divider circuit in parallel to the bridge circuit having the resistors 10-13. The middle resistor 16 is also embodied as a hot film or, preferably, as a hot wire, and the two adjacent resistors 15 and 17 have very high resistance values, so that only a very small current flows through this voltage divider circuit and self-heating of the resistor 16 is precluded as much as possible. The resistor 16 is disposed within the air intake manifold, so that its resistance will vary as a function of the air temperature within the air intake manifold, and the voltage drop across the resistor 16 will vary as a function of the air temperature within the air intake manifold as well as the current flowing therethrough.

The voltage drop across the resistor 16 is amplified by an amplifier 18 having the two output terminals 19 and 20. It is now essential that the output voltage of the amplifier 18 be added to the diagonal voltage produced between the intermediate connection points of the bridge and the total signal serve the controller 14 as an input variable. To this end, the output terminal 20 of the amplifier 18 is coupled with the intermediate connection point of the two resistors 12 and 13; the intermediate connection point of the two resistors 10 and 11 is connected at a first input terminal of the controller 14, and a second input terminal of the controller 14 is connected via a line 21 with the other output terminal 19 of the amplifier 18. Relative to the amplifier output terminal 20, the amplifier output terminal 19 and the apparatus output terminal 22 are of opposite polarity, so that variations in the bridge diagonal voltage caused by variations in the intake air temperature will be offset by corresponding variations in the amplifier output voltage. The controller 14 regulates its output current supplied to the bridge circuit so that the total signal across its two input terminals is maintained at a predetermined value and the controller output current is proportional to the flow of air through the air intake manifold. The air mass measurement signal is picked up parallel to the measurement resistor 11 and is available for use at the output terminal 22 of the apparatus.

In the subject of FIG. 1, the two resistors 10 and 16 are located inside the intake manifold, while the remaining structural components and groups of components are part of the control device. With the switching as shown, the input voltage of the controller 14 is composed of the bridge diagonal voltage, as a result of an imbalance between the particular resistance values, and the output voltage of the amplifier 18 detecting the voltage drop over the resistor 16. For this reason, the air mass measurement signal is substantially influenced by the output signal of the amplifier 18, which finally corresponds to a temperature correction of the air mass measurement signal.

In FIGS. 2, 3 and 4, the resistor 16 for detecting the induced air temperature is connected to a constant current source 25. The voltage drop brought about as a result of the current (preferably 1 to 3 mA) through the resistor 16 is delivered, in the subject of FIG. 2, to a proportional circuit, or P circuit 26; in the subject of FIG. 3, it is delivered to a proportional-differentiation circuit, or P-D circuit) 27, and in the subject of FIG. 4, finally, it is delivered to a differentiation circuit, or D circuit 28 alone. On their output sides, these circuits 26–28 are connected to a controller 29 having three inputs, of which two inputs are coupled to the junctions of the resistors 12 and 13 and of resistors 10 and 11, while the third input receives a signal from the particular P, P-D, or D circuit 26, 27 or 28. In principle, the controller 29 may be embodied identically to controller 14 of FIG. 1; only care must be taken that the output signal of the circuit 26, 27 or 28 associated with the temperature-dependent resistor 16 influences the output signal of the controller 29 and thus controls the bridge current. This means that in all the embodiments illustrated in FIGS. 1–4, the air mass measurement device in the form of resistor 10 is not operated with a constant temperature, but instead that this temperature is dependent on the induced air temperature at the time.

Stated another way, in all of the illustrated embodiments, the controller 14 or 29 regulates its output current supplied to the bridge circuit so that the voltage across the intermediate connection points of the bridge circuit is maintained at a value determined by the output signal of the signal processors 18, 26, 27, or 28.

Care must further be taken that, when using the D-circuit 28 the bridge resistor 12 is also embodied as a temperature-sensing resistor similar to that disclosed in the above-referenced U.S. Pat. No. 3,796,199, which is located in the intake manifold air flow, and selected so that its temperature follows and approximates the air flow temperature in order to include a static air temperature correction of the air mass measurement signal when the air temperature is constant or slowly changing, in addition to the dynamic air temperature correction signal supplied by the D-circuit 28 when the air temperature is rapidly changing.

In an efficient manner, a hot wire or, with limitations because of its great mass, a hot film is used for both the resistor 10 acting as the air mass measurement device and the resistor 16 for measurement of the induced air temperature, because with a hot wire time constants are produced, at temperature jumps, for example, of approximately 10 to 15 milliseconds.

Platinum is particularly suitable as the material from which resistors 10 and 16 are made.

The P-D circuit 27 used in the subject of FIG. 3 has the transfer behavior expressed in the equation:

$$ua = k1.ue + k2.ue$$

where ue indicates the input signal over time and ua indicates the output signal over time. The factor k2 must be so chosen here that there is no appreciable deviation from the final value which is to be set. This task may, however, be fulfilled exactly only at a certain point in the curve, since the transfer time of the temperature sensor is a function of the air velocity.

Naturally, the various circuits 26–28 can be realized not only through known analog circuit technology, but also, for example, in a computer by means of appropriate programming. It must be assured only that positive or negative differences are then normed and added to one and that the air mass measurement signal is then corrected with this variable, especially multiplicatively.

Also, as stated above, the controller 29 may be embodied identically to the controller 14. In such a case, the output terminals of the P, P-D, or D circuits 26, 27, 28 corresponding to the output terminals 19, 20 of the amplifier 18, may be connected to the bridge circuit 10-13 and the controller 14 in the same manner as shown in FIG. 1.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An apparatus for measuring the air flowing through the intake manifold of an internal combustion engine having a bridge circuit comprising at least four resistors, of which at least one is disposed in the air flowing in the air intake manifold, and having a controller for the electric current flowing through the bridge circuit, wherein the at least four resistors of the bridge circuit are connected to form two parallel resistive paths, each path having an intermediate connection point, and the controller is connected to receive a bridge circuit signal produced across the bridge intermediate connection points, characterized in that the apparatus includes a temperature signal generating means for generating a temperature signal pertaining to the temperature of the air flowing in the air intake manifold, and the controller is also connected to receive the temperature signal, wherein the temperature signal generating means comprises:

temperature sensing means for generating an output signal which is a function of the temperature of the air flowing in the air intake manifold; and differentiation signal processing means, connected to receive the output signal of the temperature sensing means, for supplying the temperature signal to the controller, wherein the temperature signal is a function of the rate of change of the output voltage of the temperature sensing means with respect to time.

2. An apparatus in accordance with claim 1, wherein the temperature signal generating means comprises a constant current source and a temperature sensing resistor which is disposed within the air intake manifold and which is supplied with a constant current from the constant current source.

3. An apparatus in accordance with claim 2, wherein the constant current supplied to the temperature sensing resistor has an order of magnitude of approximately 1–3 milliamperes.

4. An apparatus in accordance with claim 1, wherein one of the bridge circuit resistors disposed in the air flowing within the air intake manifold is a temperature-dependent resistor whose temperature is a function of the quantity of air flowing within the air intake manifold.

5. An apparatus for measuring the air flowing through the intake manifold of an internal combustion engine having a bridge circuit comprising at least four resistors, of which at least one is disposed in the air flowing in the air intake manifold, and having a controller for the electric current flowing through the bridge circuit, wherein the at least four resistors of the bridge circuit are connected to form two parallel resistive paths, each path having an intermediate connection point, and the controller is connected to receive a bridge circuit signal produced across the bridge intermediate connection points, characterized in that the apparatus includes a temperature signal generating means pertaining to the temperature of the air flowing in the air intake manifold, and the controller is also connected to receive the temperature signal, wherein said temperature signal generating means comprises:

temperature sensing means for generating an output signal which is a function of the temperature of the air flowing in the air intake manifold; and signal processing means, connected to receive the output signal of the temperature sensing means, for supplying the temperature signal to the controller, the signal processing means including proportional means for producing a first signal which is proportional to the output signal of the temperature sensing means, and differentiation means for producing a second signal which is proportional to the rate of change of the output voltage of the temperature sensing means with respect to time, and which is added to the proportional voltage signal to form the temperature signal supplied to the controller.

6. An apparatus for measuring the quantity of air flowing through the air intake manifold of an internal combustion engine, which comprises:

a bridge circuit having at least four resistors connected to form two parallel resistive paths, each path having an intermediate connection point, at least one of the resistors being a temperature-dependent resistor which is disposed in the air flowing in the air intake manifold, the resistance value of the temperature-dependent resistor being a function of the flow rate and temperature of air in the intake manifold and current flow through the temperature-dependent resistor, wherein a diagonal voltage produced across the bridge circuit intermediate connection points is a function of current supplied to the bridge circuit and the flow rate and temperature of the air in the air intake manifold;

temperature signal generating means for generating an output voltage to serve as an air temperature correction signal for said diagonal voltage, including a voltage divider circuit, which is connected to parallel with the two resistive paths of the bridge circuit and which includes a temperature-sensing resistor, and at least one resistor element which is connected in series with the temperature-sensing resistor and which has a very high resistance value so that only a very small current flows through the temperature-sensing resistor, to thus minimize heating of the temperature-sensing resistor by current flowing therethrough, the temperature-sensing resistor being disposed within the air intake manifold so that its resistance will vary as a function of the air temperature within the air intake manifold, and amplifier means, having two input terminals connected to receive a voltage drop across the temperature-sensing resistor and having two output terminals, for generating said output voltage across the amplifier means output terminals as a function of the voltage drop across the temperature-sensing resistor; and controller means, having an output connected to the bridge circuit and two input terminals, for regulating a controller means output current to the bridge circuit and the voltage divider circuit so that a total signal supplied across the controller means input terminals is maintained at a predetermined value, wherein one bridge circuit intermediate point is connected to one controller means input terminal, one amplifier means output terminal is connected to the other controller means input terminal, and the other amplifier means output terminal is connected to the other bridge circuit intermediate point, to add the amplifier means output voltage to the diagonal voltage and form the total signal across the controller means input terminals such that the total signal is a function of the controller means output current and the flow rate of air in the air intake manifold, whereby the controller means output current is a function of the flow of air through the air intake manifold.

7. An apparatus for measuring the quantity of air flowing through the air intake manifold of an internal combustion engine, which comprises:

a bridge circuit having at least four resistors connected to form two parallel resistive paths, each path having an intermediate connection point, at least one of the resistors being a temperature-dependent resistor, disposed in the air flowing in the air intake manifold, the resistance value of the temperature-dependent resistor being a function of the flow rate and temperature of air in the intake manifold and current flow through the temperature-dependent resistor, wherein a bridge circuit signal produced across the bridge circuit intermediate connection points is a function of current supplied to the bridge circuit and the flow rate and temperature of the air in the air intake manifold;

temperature signal generating means for generating an air temperature signal which is a function of the temperature of the air in the air intake manifold, wherein the temperature signal generating means comprises a constant current source and a temperature sensing resistor which is disposed in the air intake manifold and which has a resistance value which is a function of the temperature of the air in the air intake manifold, the temperature-sensing resistor being connected to receive constant current from the constant current source, to produce a voltage signal across the temperature-sensing resistor which is a function of the temperature of the air in the air intake manifold; and controller means, connected to receive the bridge circuit signal and the air temperature signal, for supplying current to the bridge circuit which is proportional to the quantity of air flowing in the air intake manifold.

8. An apparatus in accordance with claims 6 or 7, wherein the temperature-dependent resistor of the bridge circuit which is disposed in the air flowing within the air intake manifold is embodied as a wire.

9. An apparatus in accordance with claims 6 or 7, wherein the temperature-sensing resistor is embodied as a wire.

10. An apparatus in accordance with claims 6 or 7, wherein the temperature-dependent bridge circuit resistor whose temperature is a function of the quantity of air flowing within the air intake manifold is composed of platinum material.

11. An apparatus in accordance with claims 6 or 7, wherein the temperature-sensing resistor is composed of platinum material.

12. An apparatus in accordance with claims 6 or 7, wherein the temperature-dependent resistor of the bridge circuit which is disposed in the air flowing within the air intake manifold is embodied as a film.

13. An apparatus in accordance with claims 6 or 7, wherein the temperature-sensing resistor is embodied as a film.

14. An apparatus, as described in claim 7, wherein the temperature signal generating means further comprises proportional signal processing means, connected to receive the voltage signal produced across the temperature-sensing resistor, for producing a proportional voltage signal, which is a function of the voltage signal produced by the temperature-sensing resistor.

15. An apparatus, as described in claim 14, wherein the temperature signal generating means further comprises differentiation signal processing means, connected to receive the voltage signal produced by the temperature sensing resistor, for producing a differentiation voltage signal which is a function of the rate of change with respect to time of the voltage signal produced by the temperature-sensing resistor, and which is added to the proportional voltage signal to form the air temperature signal.

16. In an apparatus for measuring the quantity of air flowing through the air intake manifold of an internal combustion engine which includes:

a bridge circuit having at least four resistors connected to form two parallel resistive paths, each path having an intermediate connection point, at least one of the resistors being a flow-sensing resistor, which is disposed in the air flowing in the air intake manifold, the resistance value of the flow-sensing resistor being a function of the flow rate and temperature of air in the intake manifold and the current flow through the flow-sensing resistor, and at least another of the resistors being a first temperature-sensing resistor, which is disposed in the air intake manifold, the resistance value of the first temperature-sensing resistor being a function of the temperature of the air in the air intake manifold, wherein the flow-sensing resistor and the first temperature-sensing resistor are connected in the bridge circuit so that a bridge circuit voltage signal produced across the bridge circuit intermediate connection points is a function of current supplied to the bridge circuit and the flow rate of the air in the air intake manifold, and controller means, connected to receive the bridge circuit voltage signal, for supplying current to the bridge circuit which is proportional to the quantity of air flowing in the air intake manifold, the improvement which comprises:

temperature signal generating means for generating an air temperature signal which is proportional to the rate of change, with respect to time, of the temperature of the air in the air intake manifold;

wherein said controller means is also connected to receive the air temperature signal;

whereby the air temperature signal provides additional temperature correction for the bridge circuit voltage signal during rapid fluctuations in the temperature of the air in the air intake manifold.

17. An apparatus, as described in claim 16, wherein the temperature signal generating means comprises:

a source of constant current;

a second temperature-sensing resistor which is disposed in the air intake manifold and which as a resistance value which is proportional to the temperature of the air in the air intake manifold, the second temperature-sensing resistor being connected to receive constant current from the constant current source, to produce a voltage signal across the second temperature-sensing resistor which is proportional to the temperature of the air in the air intake manifold; and differentiation signal processing means, connected to receive the voltage signal produced across the second temperature-sensing resistor, for producing the air temperature signal which is proportional to the rate of change of the temperature of the air in the air intake manifold, with respect to time.

* * * * *